United States Patent
Becker et al.

(10) Patent No.: US 8,763,649 B2
(45) Date of Patent: Jul. 1, 2014

(54) SEAM CONSTRUCTION FOR A ONE PIECE WOVEN AIRBAG FABRIC

(75) Inventors: Michael Becker, Zell im Wiesental (DE); Thomas Eschbach, Bad Säckingen (DE); Andreas Enderlein, Murg (DE)

(73) Assignee: Global Safety Textiles GmbH, Maulburg (DE)

( * ) Notice: Subject to any disclaimer, the term of this patent is extended or adjusted under 35 U.S.C. 154(b) by 964 days.

(21) Appl. No.: 12/226,836

(22) PCT Filed: May 7, 2007

(86) PCT No.: PCT/EP2007/004013
§ 371 (c)(1),
(2), (4) Date: Jan. 21, 2009

(87) PCT Pub. No.: WO2007/128547
PCT Pub. Date: Nov. 15, 2007

(65) Prior Publication Data
US 2009/0184505 A1      Jul. 23, 2009

(30) Foreign Application Priority Data
May 5, 2006   (DE) .......................... 10 2006 021 082

(51) Int. Cl.
*D03D 3/00* (2006.01)
*B60R 21/23* (2006.01)
*B32B 5/26* (2006.01)

(52) U.S. Cl.
CPC . *D03D 3/00* (2013.01); *B60R 21/23* (2013.01)
USPC .................... 139/384 R; 280/728.1; 442/76

(58) Field of Classification Search
CPC .................. B60R 21/26; B60R 21/235; B60R 2021/23547; D03D 1/02; B32B 5/26; D06M 15/643
USPC .................. 139/383 R, 384 R, 387 R, 420 R; 280/728.1, 729, 730.1, 733, 743.1, 280/743.2; 383/3; 428/57, 58, 68, 69, 112, 428/34.1, 36.91, 102, 192, 193; 442/59, 76
See application file for complete search history.

(56) References Cited

U.S. PATENT DOCUMENTS

| | | |
|---|---|---|
| 3,456,692 A | 7/1969 | Kronoff |
| 3,460,583 A | 8/1969 | Mosher |
| 3,996,971 A | 12/1976 | Griffith et al. |
| 4,004,616 A | 1/1977 | Andronov et al. |
| 4,174,738 A | 11/1979 | Berger et al. |
| 4,313,473 A | 2/1982 | Reiter |
| 4,565,535 A | 1/1986 | Tassy et al. |

(Continued)

FOREIGN PATENT DOCUMENTS

| | | |
|---|---|---|
| DE | 39 03 216 A1 | 8/1990 |
| DE | 198 52 232 | 5/2000 |

(Continued)

*Primary Examiner* — Arti Singh-Pandey
(74) *Attorney, Agent, or Firm* — Pearne & Gordon LLP

(57) ABSTRACT

A seam construction for a woven fabric for an OPW airbag, in particular for person restraint systems, which seam construction is characterized by a weaving seam having a single-layer region which is surrounded by an at least two-layer region, the individual layers of which have in each case a looser woven structure than the single-layer region.

28 Claims, 1 Drawing Sheet

(56) References Cited

U.S. PATENT DOCUMENTS

| | | |
|---|---|---|
| 4,660,605 A | 4/1987 | Koch |
| 4,977,016 A | 12/1990 | Thornton et al. |
| 5,094,477 A | 3/1992 | Togawa |
| 5,131,434 A | 7/1992 | Krummheuer et al. |
| 5,296,278 A | 3/1994 | Nishimura et al. |
| 5,299,603 A | 4/1994 | Reiter et al. |
| 5,333,899 A | 8/1994 | Witte et al. |
| 5,560,648 A | 10/1996 | Rhule et al. |
| 5,651,395 A | 7/1997 | Graham et al. |
| 5,654,067 A | 8/1997 | Dinger et al. |
| 5,685,347 A | 11/1997 | Graham et al. |
| 5,700,532 A | 12/1997 | Chiou |
| 5,707,711 A | 1/1998 | Kitamura |
| 5,769,130 A | 6/1998 | Brielman |
| 5,789,084 A | 8/1998 | Nakamura et al. |
| 5,826,905 A | 10/1998 | Tochacek et al. |
| 5,952,250 A | 9/1999 | Kim et al. |
| 6,007,092 A | 12/1999 | Martz |
| 6,024,380 A | 2/2000 | Kim et al. |
| 6,177,365 B1 | 1/2001 | Li |
| 6,177,366 B1 | 1/2001 | Li |
| 6,220,309 B1 | 4/2001 | Sollars, Jr. |
| 6,265,690 B1 | 7/2001 | Förnsel et al. |
| 6,299,206 B1 | 10/2001 | Keshavaraj |
| 6,429,155 B1 | 8/2002 | Li et al. |
| 6,451,715 B2 | 9/2002 | Li et al. |
| 6,467,802 B2 | 10/2002 | Heigl |
| 6,569,788 B1 | 5/2003 | Hurst et al. |
| 6,595,244 B1 | 7/2003 | Sollars, Jr. |
| 6,632,753 B1 | 10/2003 | Beasley, Jr. |
| 6,641,165 B2 | 11/2003 | Ohhashi |
| 6,645,565 B2 | 11/2003 | Veiga |
| 6,672,617 B1 | 1/2004 | Gilpatrick et al. |
| 6,698,458 B1 | 3/2004 | Sollars, Jr. et al. |
| 6,701,971 B1 | 3/2004 | Sollars, Jr. et al. |
| 6,705,244 B1 | 3/2004 | Berger et al. |
| 6,734,124 B2 | 5/2004 | Hurst et al. |
| 6,749,220 B1 | 6/2004 | Wipasuramonton et al. |
| 6,753,275 B2 | 6/2004 | Veiga |
| 6,770,578 B2 | 8/2004 | Veiga |
| 6,866,068 B2 | 3/2005 | Berger et al. |
| 6,883,557 B1 | 4/2005 | Eschbach et al. |
| 6,918,410 B1 | 7/2005 | Berger et al. |
| 6,918,411 B2 | 7/2005 | Berger et al. |
| 6,994,125 B2 | 2/2006 | Tröndle et al. |
| 7,069,961 B2 | 7/2006 | Sollars, Jr. |
| 7,690,401 B2 * | 4/2010 | Okuno et al. ............ 139/384 R |
| 7,780,194 B2 | 8/2010 | Trondle et al. |
| 2001/0026066 A1 | 10/2001 | Tanabe et al. |
| 2001/0030416 A1 | 10/2001 | Tanabe et al. |
| 2002/0033589 A1 | 3/2002 | Barnes |
| 2002/0037755 A1 | 3/2002 | Rodemer et al. |
| 2002/0038950 A1 | 4/2002 | Masuda et al. |
| 2002/0043792 A1 | 4/2002 | Keshavaraj |
| 2002/0060449 A1 | 5/2002 | Keshavaraj |
| 2002/0125702 A1 | 9/2002 | Ohhashi |
| 2002/0140218 A1 | 10/2002 | Beasley, Jr. |
| 2002/0175510 A1 | 11/2002 | Veiga |
| 2003/0060104 A1 | 3/2003 | Veiga |
| 2003/0129339 A1 | 7/2003 | Barnes |
| 2003/0166367 A1 | 9/2003 | Berger et al. |
| 2004/0182468 A1 | 9/2004 | Trondle et al. |
| 2004/0200540 A1 | 10/2004 | Busskamp et al. |
| 2005/0130520 A1 | 6/2005 | Mouri et al. |
| 2005/0161919 A1 | 7/2005 | Berger et al. |
| 2006/0005913 A1 | 1/2006 | Berger |
| 2006/0014456 A1 | 1/2006 | Li |
| 2006/0016546 A1 | 1/2006 | Berger |
| 2006/0151882 A1 | 7/2006 | Trondle et al. |
| 2006/0249933 A1 | 11/2006 | Sollars |
| 2007/0007756 A1 | 1/2007 | Okuno et al. |
| 2007/0278775 A1 | 12/2007 | Ting et al. |
| 2008/0147278 A1 | 6/2008 | Breed |

FOREIGN PATENT DOCUMENTS

| | | |
|---|---|---|
| DE | 198 52 232 A1 | 5/2000 |
| DE | 19859767 | 7/2000 |
| DE | 198 57 034 | 8/2000 |
| EP | 0 477 521 | 4/1992 |
| EP | 0 733 732 | 9/1996 |
| EP | 1 238 867 | 9/2002 |
| GB | 1 603 572 | 11/1981 |
| GB | 2 251 410 | 7/1992 |
| JP | 2204151 | 8/1990 |
| JP | 3-82645 | 4/1991 |
| JP | 3082645 | 4/1991 |
| JP | 6-18105 | 3/1994 |
| JP | 10-187045 | 7/1998 |
| WO | WO 2002/070252 | 9/2002 |
| WO | WO 2004/042128 | 5/2004 |
| WO | WO 2004/048658 | 6/2004 |

* cited by examiner

SEAM CONSTRUCTION FOR A ONE PIECE WOVEN AIRBAG FABRIC

CROSS REFERENCE TO RELATED APPLICATIONS

This application is a National Phase Entry of PCT/EP2007/004013, filed May 7, 2007, which claims priority to German Application No. 10 2006 021 082.4, filed May 5, 2006. Both of these applications are incorporated by reference herein.

BACKGROUND AND SUMMARY

The present invention relates to a seam construction for an OPW air bag woven fabric, particularly for passenger restraint systems.

With one-piece woven (OPW) air bags currently in use featuring single- and multi-ply portions to which a sealing coat, e.g. a film, is applied, there is the risk in the woven plane of gas escaping in single-ply portions simultaneously forming a seam-like link for the multi-ply portions brought together therein, because the coating intended to seal the air bag is applied only to the top and bottom, i.e. not preventing escape of the gas at the sides. Known from DE 103 26 757 A1 is a woven seam construction for an OPW air bag in which a coating can penetrate deeper into the woven fabric due to a woven construction in the single-ply portion of the seam having a looser weave. Although this construction is suitable to enhance the seam seal in the woven plane it still fails to produce satisfactory results as to its safety. In the single-ply portions at least three layers, namely the top coating as the first layer, the single-ply woven portion as the second layer and the bottom coating as the third layer are arranged one on top of the other. The woven material sandwiched between the coatings having a certain thickness, is by nature not a seal and can thus permit passage of the gas through the woven fabric in the woven plane between the coatings or films. This results in making it difficult to attain the useful duration demanded of air bags nowadays, particularly as regards side or head air bags, unless the gas loss is made up for by means of costly "inflators which supplement the escaped gas e.g. over several stages. "Useful duration" in this sense is the duration of an air bag remaining substantially inflated in cushioning the passenger after activation by vehicle impact. The gas loss also involves compensating a large quantity of gas generant, if need be. Yet a further drawback is that seam leakage may allow gas to gain access to the vehicle interior injurious to passengers by the gas itself and its high temperature.

An object of the invention is to propose a seam construction which avoids or at least diminishes the drawbacks of prior art. This object is achieved by a seam construction as it reads from claim 1, characterized by a woven seam having a single-ply seam portion surrounded by an at least a two-ply portion, the individual plies of which each comprise a looser woven structure than that of the single-ply portion. This improved seam construction in accordance with the invention makes it possible to achieve a substantially higher seal of an OPW air bag, since the quantity of gas escaping by leakage can now be substantially reduced, because coatings on the woven fabric can now penetrate very deeply into the woven fabric in the region of the seam in thus minimizing the spacing of the coatings from each other. This now makes it much easier to attain the wanted long useful duration.

In one advantageous aspect of the invention the seam construction is characterized in that the two-ply portion comprises the same number of threads as that of the single-ply portion, ensuring to advantage a harmonized weave with a minimum of distortions. In another advantageous aspect of the invention the seam construction is characterized in that the two-ply portion comprises an upper ply and a lower ply, both of which differ from the single-ply portion by each having a looser woven construction. This now makes it possible to customize the depth to which a coating penetrates on both sides of the woven fabric. This is particularly of advantage in transitions from a two to four or more ply air bag woven fabric when the side "facing the pressure side", in other words, the side which receives the pressure of the inflation gas—as a rule the inner side of the air bag—needs to have a woven structure other than that of the opposite side.

In still another advantageous aspect of the invention the seam construction is characterized in that the upper ply has a plain weave L1/1 and the lower ply a basket weave P3/3, it having been discovered that such a construction is most expedient particularly in minimizing distortions in the weave. In yet a further advantageous aspect of the invention the seam construction is characterized in that the woven seam comprises a single-ply seam portion surrounded by a three-ply portion to further enhance the advantage of presetting the individual woven structure and the penetration capacity of the coatings. In another advantageous aspect the seam construction is characterized in that the three-ply portion comprises the same number of threads as the single-ply portion enhancing to advantage the ability to create a harmonized weave in minimizing distortions therein.

In yet a further advantageous aspect of the invention the seam construction is characterized in that the three-ply portion features an upper ply, a middle ply and a lower ply, each having a looser woven structure than that of the single-ply portion. This basically further increases to advantage the possibilities of varying the weave whilst simplifying setting individual woven portions to predefined woven construction requirements, in addition to making for an even better penetration of the coatings into the woven structure. In still another advantageous aspect of the invention the seam construction is characterized in that the upper ply and the lower ply are interconnected here and there. The purpose of this is to prevent or at least make it difficult that the plies become parted or separated from each other when chambers of pressure build up in the air bag between the plies because of the woven structure between the coatings of the sealed portions. What is generally to be appreciated as being novel is that the nature of sealing the seam in accordance with the invention is now achieved not just by a single-ply seam weave or by a looser fabric weave, but by a multi-ply woven construction or combination of single and multi-ply woven constructions.

BRIEF DESCRIPTION OF THE DRAWINGS

The invention will now be briefly described by way of a few example embodiments with reference to the drawing in which.

DETAILED DESCRIPTION

Figure 1:
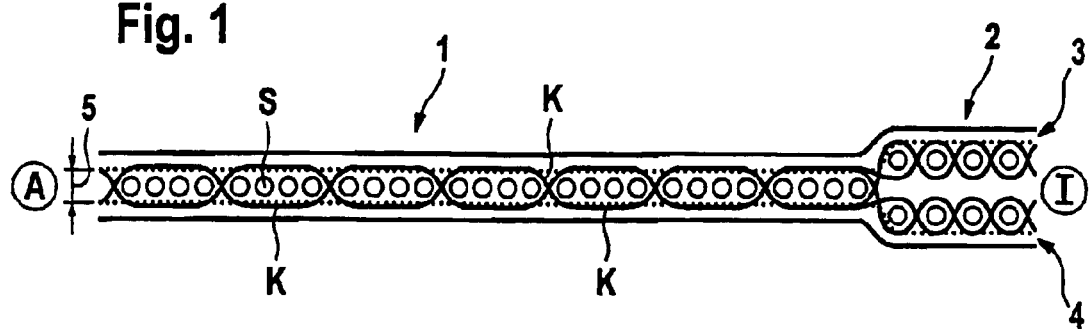
FIG. 1 is a diagrammatic cross-sectional view of a standard seam woven as known from prior art.

Shown diagrammatically in FIGS. 1 to 4 is a cross-sectional view of a woven seam 1 of an OPW air bag adjoined by part of a chamber portion 2 of the air bag wherein the thin circles represent weft threads S in cross-section penetrating the plane of the drawing and the thick black lines represent warp threads K running substantially parallel to the plane of the drawing. However, it is just as possible that the woven construction is configured conversely in a reverse arrangement of the weft and warp threads. Coating each top and bottom side are the coatings 3, 3a, 3b, 3c, 4, 4a, 4b, 4c e.g. laminated or doctored in place to seal the woven fabric. Each of the coatings 3, 3a, 3b, 3c, 4, 4a, 4b, 4c is depicted defined outwardly by the bold lines and in the direction of the weave by the dotted lines, the latter thus also depicting the depth of penetration of the coating in the woven fabric.

Referring now to FIG. 1 there is illustrated a standard seam woven as known from prior art. Because of the density of this seam the coatings 3 and 4 are able to penetrate into the woven structure only a little, resulting in a spacing 5 remaining between the opposing coatings in the woven plane. It is because of this spacing 5 that gas is able to escape through the woven structure sandwiched between the coatings from the chamber portion I, in other words the inner portion of the air bag, outwards, i.e. to A.

Figure 2:
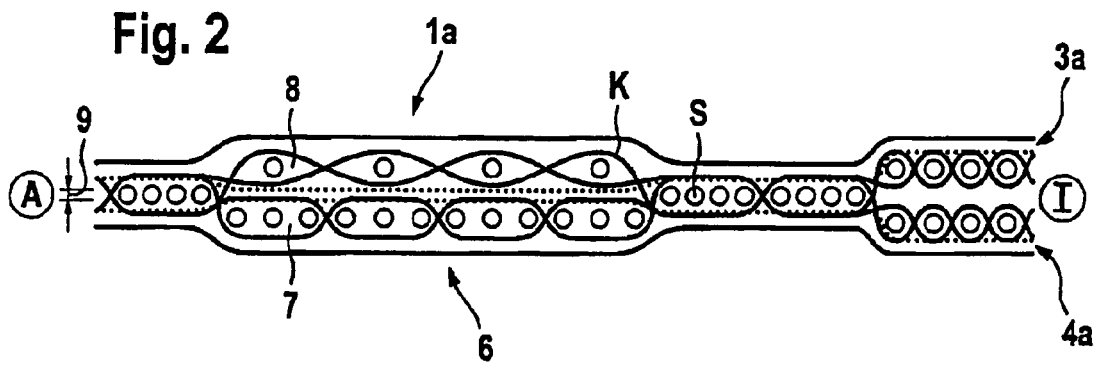
FIG. 2 is a diagrammatic cross-sectional view of an example of a seam construction woven in accordance with the invention.

Referring now to FIG. 2 there is illustrated an example of a coating of a woven seam 1a in accordance with the invention, part of which is configured two-ply at 6. The lower ply 7 is e.g. a basket weave P3/3 whilst the upper ply 8 is e.g. a plain weave 1/1. Because of this resulting in a looser woven structure 6 the coatings can penetrate deeper into this portion of the seam. In other words, the spacing 9 between the opposing coatings is now reduced as compared to the situation depicted in FIG. 1, resulting in the gas loss as described above likewise being reduced.

Figure 3:
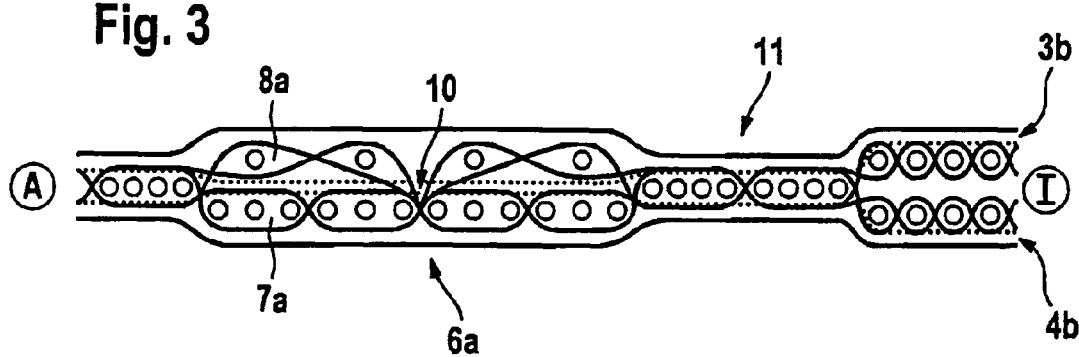
FIG. 3 is a diagrammatic cross-sectional view of a seam construction substantially the same as shown in FIG. 2 but in which the loose seam portion has an extra tie.

Referring now to FIG. 3 there is illustrated the situation substantially the same as in FIG. 2, except that the loose seam portion has an extra tie at 10. This makes it difficult for, or even prevents, separation of the plies 7a and 8a at high chamber pressures as build up by the woven structure sandwiched between the coatings of the dense portions 11 between the plies 7a and 8a.

Figure 4:
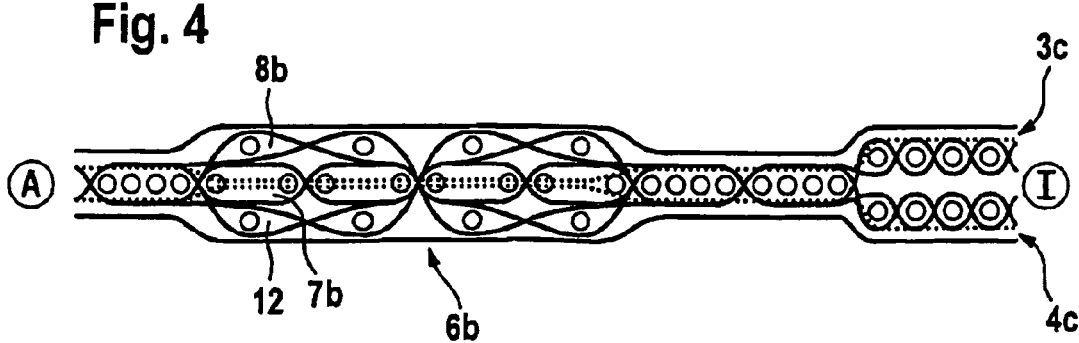
FIG. 4 is a diagrammatic cross-sectional view of a woven including a seam having a loose seam portion, configured even more loose by a three-ply configuration of the seam.

Referring now to FIG. 4 there is illustrated how the loose seam portion 6b is configured even looser by a three-ply configuration comprising an upper ply 7b, a middle ply 8b and a lower ply 12 to thus permit even better penetration of the coating into the woven structure.

The invention claimed is:

1. A seam construction for an OPW air bag woven fabric, the seam construction comprising:
   a woven seam having a single-ply portion surrounded by an at least two-ply portion, the individual plies of which each comprise a looser woven structure than that of the single-ply portion; and
   the two-ply portion further comprising an upper ply and a lower ply, the upper ply having a different woven structure than the lower ply and both the upper ply and the lower ply having a looser construction than the single-ply portion.

2. The seam construction as set forth in claim 1, wherein the two-ply portion further comprises the same number of threads as that of the single-ply portion.

3. The seam construction as set forth in claim 1, wherein the upper ply has a plain weave and the lower ply a basket weave.

4. The seam construction as set forth in claim 1, wherein the woven seam further comprises a single-ply seam portion surrounded by a three-ply portion.

5. The seam construction as set forth in claim 4, wherein the three-ply portion comprises the same number of threads as the single-ply portion.

6. The seam construction as set forth in claim 4, wherein the three-ply portion features an upper ply, a middle ply and a lower ply, each having a looser woven structure than that of the single-ply portion.

7. The seam construction as set forth in claim 1, wherein the upper ply and the lower ply are interconnected in multiple locations.

8. The seam construction of claim 1, wherein the at least two-ply portion consists essentially of individual plies of which each comprises a looser woven structure than that of the single-ply portion.

9. A vehicular airbag comprising:
   a first section including a single-ply woven layer;
   a second section including at least two-ply woven layers;
   the first and second sections being woven adjacent each other as a one-piece-woven fabric;
   a gas flow-resistant material located on outer surfaces of the first and second sections; and
   at least a majority of one of the layers of the second section having a different weaving pattern than at least a majority of the other of the layers of the second section, such that the second section has a looser woven pattern than the first section, the different patterns of the second section allowing penetration of the gas flow-resistant material into the woven layers of the second section.

10. The airbag as set forth in claim 9, wherein the gas flow-resistant material is a coating.

11. The airbag as set forth in claim 9, wherein the gas flow-resistant material is a laminate.

12. The airbag as set forth in claim 9, wherein the second section includes three plies of woven fabric connected to the first section in a one-piece-woven manner, the first section being substantially surrounded by the second section.

13. The airbag as set forth in claim 9, wherein at least a majority of one of the layers of the second section includes a plain weave pattern and at least a majority of the other of the layers of the second section includes a basket weave pattern.

14. A vehicular airbag comprising a three-ply fabric portion substantially surrounding a single-ply fabric portion, the three-ply and single-ply fabric portions being woven together as a single fabric where the three-ply fabric portion has a looser woven pattern that the single-ply fabric portion, and where at least a first ply of the three-ply fabric is of a different woven structure than a second ply of the three-ply fabric.

15. The airbag as set forth in claim 14, further comprising a gas flow-resistant material located on the fabric portions.

16. The airbag as set forth in claim 14, wherein at least a majority of at least one of the three-ply layers has a woven pattern different than a majority of the single-ply portion.

17. The airbag as set forth in claim 14, further comprising a tie attaching together the three-ply layers at a position spaced away from the single-ply portion.

18. The airbag as set forth in claim 14, further comprising a two-ply fabric portion located on an opposite side of the single-ply portion from the three-ply portion.

19. The airbag as set forth in claim 14, wherein the single-ply portion includes a basket woven pattern and at least one layer of the three-ply portion includes a basket woven pattern.

20. A vehicular airbag comprising:
   a first portion including a single-ply woven layer; and
   a second portion including at least two-ply woven layers, the individual plies having different woven structures from each other and a looser woven structure than the single-ply woven layer;

at least one of the layers of the second portion including a basket woven pattern;

at least another of the layers of the second portion including a plain woven pattern; and the first and second portions being part of a one-piece-woven airbag fabric.

21. The airbag as set forth in claim 20, further comprising a coating located on each external surface of the second portion and penetrating into the outer woven layers thereof.

22. The airbag as set forth in claim 20, further comprising a laminate located on each external surface of the second portion and penetrating into the outer woven layers thereof.

23. The airbag as set forth in claim 20, wherein the woven pattern of one of the layers of the second portion is entirely different than that of the first portion.

24. The airbag as set forth in claim 20, further comprising a third portion located on an opposite side of the first portion than the second portion, the third portion including two-ply woven layers, and an inflation gas chamber located between the layers of the third portion.

25. The airbag as set forth in claim 20, further comprising a tie attaching together the layers of the second portion at a position spaced away from the first portion.

26. The airbag as set forth in claim 20, wherein the basket woven pattern includes a three by three basket.

27. A vehicular airbag comprising:

a first section including a single-ply woven layer acting as a seam;

a second section including at least two-ply woven layers;

the first and second sections being woven adjacent each other as a one-piece-woven airbag fabric;

a gas flow-resistant material located on the first and second sections;

at least a majority of one layer of the second section including a plain weave pattern and at least a majority of another layer of the second section including a basket weave pattern, the layers of the second section having a looser woven pattern than the first section;

a third portion located on an opposite side of the first portion than the second portion, the third portion including two-ply woven layers, and an inflation gas chamber located between the layers of the third portion; and a tie attaching together the layers of the second portion at a position spaced away from the first portion.

28. The airbag as set forth in claim 27, wherein the second section includes three plies of woven fabric connected to the first section in a one-piece-woven manner, the first section being substantially surrounded by the second section.

* * * * *